United States Patent [19]

Huff, Jr. et al.

[11] Patent Number: 5,166,489
[45] Date of Patent: Nov. 24, 1992

[54] INTEGRATED GAPBOX FOR ELECTROEROSIVE MACHINING APPARATUS

[75] Inventors: Darrel D. Huff, Jr., Huntersville; George J. Cole, Denver, both of N.C.

[73] Assignee: Elox Corporation, Davidson, N.C.

[21] Appl. No.: 652,445

[22] Filed: Feb. 7, 1991

Related U.S. Application Data

[63] Continuation of Ser. No. 485,176, Feb. 26, 1990, abandoned.

[51] Int. Cl.⁵ .............................................. B23H 7/10
[52] U.S. Cl. .................................................. 219/69.12
[58] Field of Search .......................... 361/385; 219/69.12, 219/69.13, 69.15; 204/206, 224 M

[56] References Cited

U.S. PATENT DOCUMENTS

| 3,777,108 | 12/1973 | Maillet | 219/69.13 |
| 4,205,212 | 5/1980 | Ullmann et al. | 219/69.12 |
| 4,539,459 | 9/1985 | Yamagata | 219/69.12 |
| 4,566,529 | 1/1986 | Klein | 361/385 |
| 4,667,077 | 5/1987 | Goto | 219/69.12 |
| 4,894,504 | 1/1990 | Truty | 219/69.12 |

FOREIGN PATENT DOCUMENTS 0313049 10/1988 European Pat. Off.
63-207512 8/1988 Japan ............................. 219/69.12

Primary Examiner—Geoffrey S. Evans
Attorney, Agent, or Firm—EGLI International

[57] ABSTRACT

A packaging arrangement in an electroerosive machining apparatus wherein a housing for electrical componentry supply machining pulses to the wire electrode is placed in close relation thereto. The housing provides a conductive area of relatively large surface area and short length for minimizing extraneous electrical effects in the machining pulses as well as a cooling mechanism for the electrical componentry.

10 Claims, 3 Drawing Sheets

INTEGRATED GAPBOX FOR ELECTROEROSIVE MACHINING APPARATUS

CROSS REFERENCE TO RELATED APPLICATIONS

This is a continuation of application Ser. No. 485,176, filed Feb. 26, 1990 and now abandoned.

BACKGROUND OF THE INVENTION

The present invention relates to apparatus used for the electroerosive working of workpieces. More particularly, the invention relates to packaging of electrical componentry in an integrated gapbox in close relation to the working gap for providing the generation of desired machining pulses to the wire and workpiece. The gapbox of the present invention is relatively simple in construction, and is simple to install while being effective in operation.

Electro-erosive working methods, particularly spark-erosive cutting methods, are largely based on empirical findings and hypotheses, because there has hitherto been no conclusive physical description of the discharge processes in the work gap. Thus, in the case of cutting processes using a wire or strip electrode, apart from the effects of gravity, a problem is also caused by vibrations formed as a result of electromagnetic, electrostatic, as well as mechanical or hydraulic effects.

In view of such disturbances, particularly high demands are made on the power modules, comprising generators and switching circuitry, used to provide the desired machining pulses to the wire and workpiece. The time control of the discharge process takes place by the controlled switching on or off of the generator with the use of a plurality of power switching circuits placed in parallel relation to the wire electrode for generating selectable pulse shapes for the discharge current. For example, a clock may provide clock pulses at a predetermined frequency, and this pulse train is used as a time pattern of trigger pulses to be supplied to the switching circuits as from stored instructions. Desired profiles of pulses may be set as well. In this manner, the erosion process may be readily controlled. Examples of such cutting methods and processes may be found in U.S. Pat. Nos. 3,928,163 and 4,655,888.

Disturbances of the erosion process may occur, however, in the distribution of the discharge signals along signal-carrying media to the workpiece. Transmission line disturbances in the signal-carrying media can create undesirable effects in the machining process. For example, during the transmission of pulses supplied to the wire, inductive effects as well as distributed capacitive effects in the discharge signal leads tend to distort the desired waveform. In addition, irregular switching of the plurality of switching circuits may cause undesirable machining pulses which result in less accurate machining or even damage to the switching circuitry.

It is therefore known to provide diodes at the outputs of the power modules for isolation of the outputs. In these systems, the switching circuitry and isolation diodes normally are placed in a power control cabinet having their outputs connected to cabling leading from a location distant from the working area and working gap. When the erosion pulse becomes active and inactive, the lead length from the outputs of the isolation diodes to the wire electrode cause a transmission line effect wherein collapsing magnetic fields in the wiring create voltage spikes relative to multiples of the length of wire. The p-n junctions of the isolation diodes tend to dissipate energy caused by these transient voltage spikes which reduces the energy applied to the working gap. Accordingly, use of such machining pulse circuitry in known arrangements generates great amounts of heat. Moreover, the componentry is susceptible performance degradation and frequent breakdowns due to this effect.

In addition, secondary inductance and distributed capacitance appears in the cabling arrangements between the output of the isolation diodes and the working area when the diodes are placed in such a remote location notwithstanding the resistive losses in the wire. These effects tend to distort the desired waveform of machining pulses supplied to the working gap and wire.

Prior approaches to this problem provide tuning circuitry for the output lines placed in the power delivering output circuitry. However, where tooling, the type of workpiece, and wire are constantly rearranged depending upon the particular application, such tuning circuitry must constantly be modified. Moreover, such approaches fail to address the transmission line effect caused by collapsing magnetic fields in the erosion process.

OBJECTS OF THE INVENTION

It is therefore an object of the present invention to provide an electrical packaging arrangement of the machining pulse delivering circuitry which overcomes the deficiencies of the prior art.

It is an additional object of the present invention to provide a packaging arrangement that minimizes the inductive effects generated by secondary cabling in supplying machining pulses to a wire.

A further object of the present invention is to provide an arrangement for cooling the heat dissipating componentry of power delivering circuitry in the machining apparatus.

A still further object of the present invention is to provide a cleaner machining pulse with a faster rise and fall time and with less of a tendency to drive the voltage on the wire to undesired voltage levels.

An additional object of the present invention is to provide a packaging arrangement that saves space and eliminates wiring and plumbing complications of previous designs.

SUMMARY OF THE INVENTION

These objects are accomplished by the present invention by further developing the method and apparatus for generating desired pulse shapes for the discharge current. According to the invention, an integrated gap box is provided for housing electrical componentry in close relation to the work gap defined by the tool electrode and the workpiece. In addition, the gapbox provides a large conductive area in contact with the electrical componentry for a power delivering path to the wire electrode. In this way, inductive effects and resistivity between the power delivering circuitry and the workpiece is diminished.

The invention also makes it possible to provide a cooling mechanism with the use of the fluid medium supplied to the working gap by the normal fluid delivery means of the system. Advantageously, a threaded bore is formed in the gapbox as an integral part of the fluid delivery means which cools the heat dissipating circuitry housed in the gapbox. Thus, a desired machining pulse may be supplied for maintaining an excellent uniform surface quality of the workpiece, as well as high erosion capacity and high cutting rate.

BRIEF DESCRIPTION OF THE DRAWINGS

For a more complete understanding of this invention, reference should now be made to the embodiment illustrated in greater detail in the accompanying drawings and described below by way of example of the invention. In the drawings.

DESCRIPTION OF THE PREFERRED EMBODIMENT

The following detailed description will permit a more complete understanding of this invention. However, the embodiments described below are simply examples of the invention and the invention is not limited to these embodiments. Furthermore, the drawings are not necessarily to scale. In certain instances, details may have been omitted which are not necessary for an understanding of the present invention.

Generally, the present invention relates to a packaging arrangement in an electroerosive machining apparatus wherein an integrated gapbox for housing electrical componentry is placed in close relation to the working gap and wire. According to the invention, the gapbox provides a housing for isolation diodes which comprise a portion of the power supplying circuitry that supplies the desired waveform of pulses to the wire electrode. The gapbox provides a relatively large electrically conductive area of relatively short length to reduce the resistivity of the path of the pulses to the wire electrode and to reduce the transmission and inductive losses otherwise present in known cabling arrangements. Another important feature of the invention provides a cooling mechanism for the electrical componentry in the gapbox.

Figure 1:
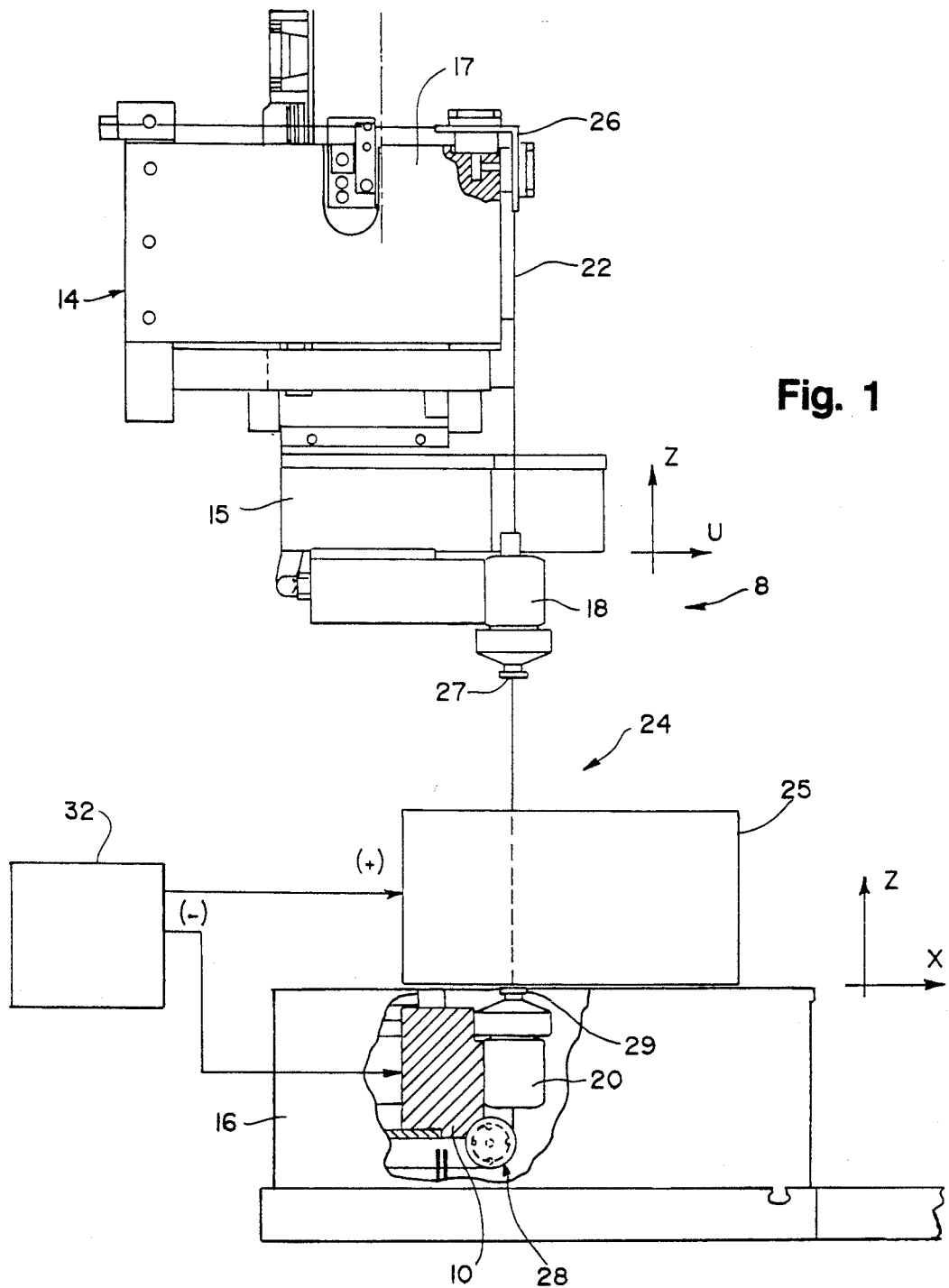
FIG. 1 is a simplified representative cross-section of an electroerosive machining apparatus including an integrated gapbox according to the present invention.

Turning now to the drawings, FIG. 1 shows an electroerosive machining apparatus 8 including an integrated gapbox 10 according to the invention. Illustratively, the electroerosive machining apparatus 8 includes a column (not shown) which supports an upper arm 14 and a lower arm 16. The upper and lower arms 14, 16 support upper and lower wire guide assemblies 18 and 20. The wire guide assemblies support a wire electrode 22 for manipulation of the wire electrode 22 to cut a workpiece 25. In operation, the wire electrode 22 is positioned in a working zone or area 24 wherein a working gap of approximately 0.003 inches is provided between the wire electrode 22 and the workpiece 25. The wire electrode 22 continuously moves axially through the working zone 24 and is maintained under tension between upper and lower pulleys 26 and 28. An upper nozzle portion 27 and a lower nozzle portion 29 attached to the wire guide assemblies 18 and 20, respectively, provide outlet parts through which a dielectric liquid, such as deionized water or oil, flows along the wire electrode 22 and into the working zone 24 and working gap. As will be understood by those skilled in the art to which this invention pertains, when the applied signal across the working gap becomes sufficiently high, the dielectric liquid becomes ionized to form an instantaneous and intense conductive channel between the wire 22 and the workpiece.

The pattern of the cut path for the workpiece is determined by a diagrammatically indicated X, Y, U, V, and Z-coordinate control, preferably a numerical control. The upper guide assembly 18 and the lower guide assembly 20 are shown with wire 22 in a portion of the overall EDM machine 8 in FIG. 1. It will be understood that the upper guide arm 14 travels in the u-v axis by means of a u-v axis assembly 15. The u-v axis assembly permits translation of the upper guide 18 in the u and v horizontal axes. In like manner, the lower guide arm 16 is operatively connected for translation of the lower guide 20 in the x and y horizontal axes. The wire 22 is fed horizontally and then vertically along an upper bracket assembly 17. Both the upper bracket assembly 17 and lower guide arm 16 include portions which are not shown in the drawings. In this way, the coordinate axes of the workpiece are driven in relation to the wire electrode 22.

Power delivering circuitry 32 supplies a stream of pulses to the wire 22 for electrically eroding the workpiece. The positive pole (+) of the power delivering circuitry 32 is connected to one connecting point of the workpiece, and in the circuitry of the upper and lower wire guide assemblies 18 and 20. The negative pole (−) of the power delivering circuitry 32 is led to the wire electrode 22. The polarity can be reversed, as is known in the art, for particular machining operations.

Figure 2:
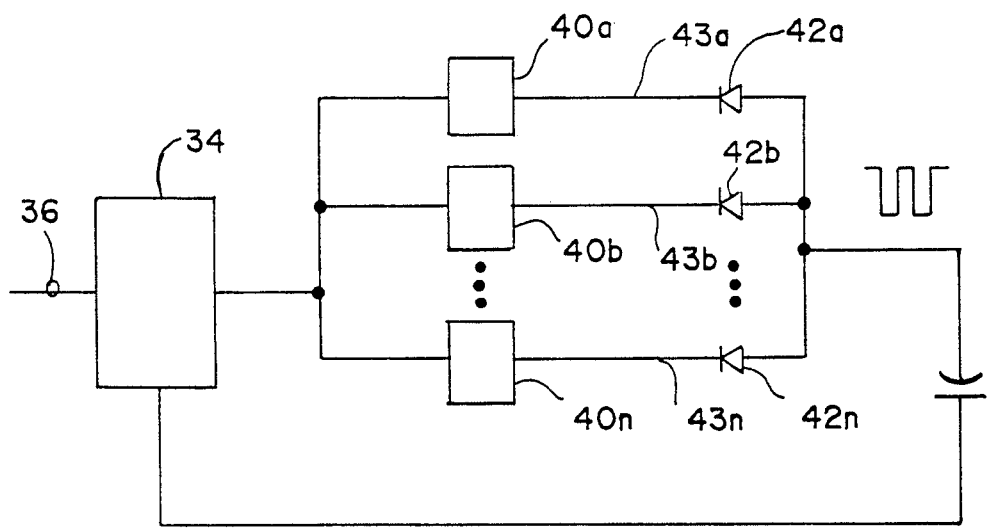
FIG. 2 is a simplified electrical schematic diagram of the pulse generating and delivering circuitry used by the electroerosive machining apparatus of FIG. 1.

Turning now to FIG. 2, therein is shown a simplified electrical schematic of the circuitry that supplies a desired waveform of pulses to the wire electrode 22 according to the present invention. As shown in FIG. 2, three phase power is applied to voltage generating circuitry 34 on a line 36 which provides a direct voltage output at a line 38. The voltage generated at line 38 will typically be 80 volts dc for some applications, however, other voltages could just as easily be used.

Typically, n-switching circuits 40a through 40n are arranged in parallel to provide a clean pulse train from the output line 38 of the voltage generating circuitry 34. In the preferred embodiment, eight switching circuits are used to generate negative pulses with respect to ground. Each output of the switching circuits 42a through 42n are supplied on the lines 43a through 43n to the anode of respective isolation diodes 42a through 42n for circuit protection. It has been found that use of isolation diodes 42a through 42n prevent undesired switching disturbances of the switching circuits which may cause an altered pulse train or even damage the system.

In known systems, the switching circuits 40a through 40n as well as the isolation diodes 42a through 42n are placed in a remote electrical cabinet. Supply cabling is then provided from the output of the isolation diodes 42a through 42n to the wire electrode 22. Such wiring, however, creates secondary inductive effects as well as transmission line losses. Moreover, signal reflections in the switching circuitry and secondary cabling create distortions in the desired machining pulse as well as component failures. In addition, the componentry dissipates heat due to the transition of relatively high operating currents and voltages. Thus, in known systems, the remote cabinet may become overheated and cause damage or failure of the system. Alternatively, preventative measures such as reducing the frequency of the pulse train must be taken which adversely effect the speed of the machining operation.

Figure 3:
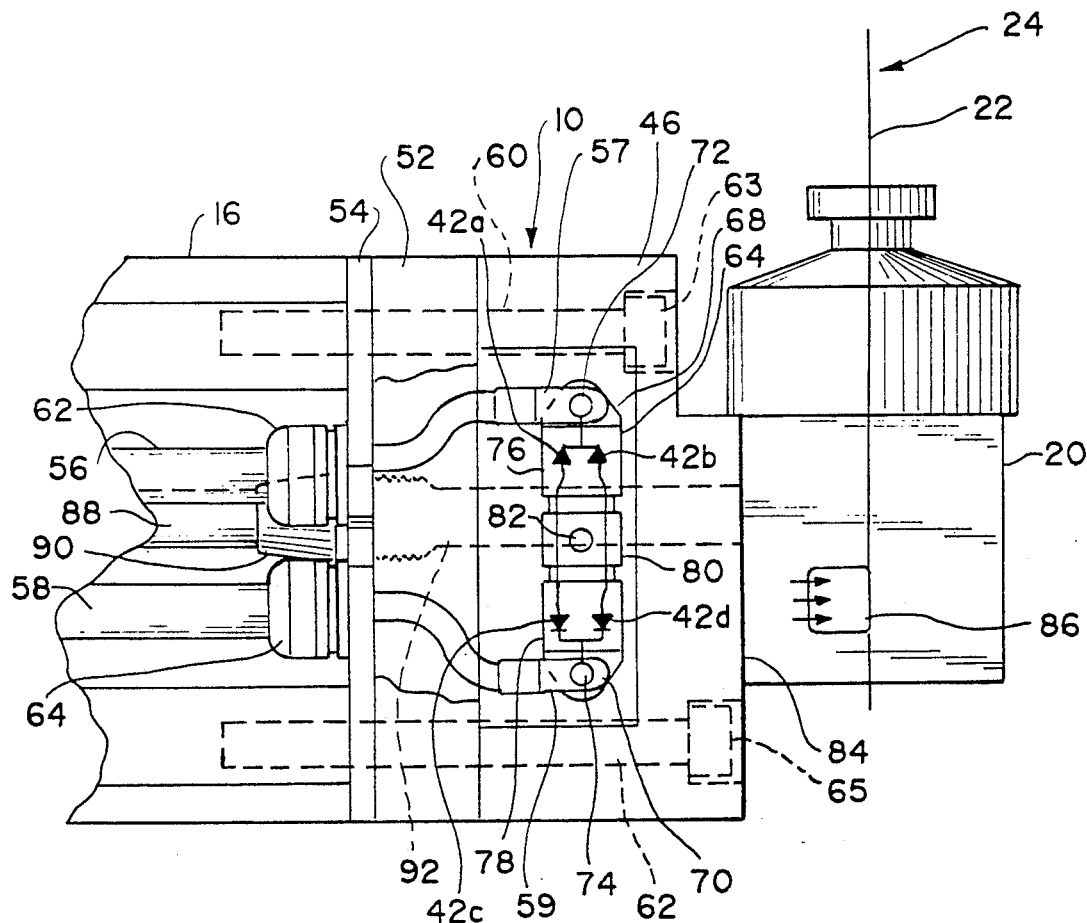
FIG. 3 is a sectional view of one embodiment of the integrated gapbox in close relation to the wire guide and flushing assembly of the electroerosive machining apparatus of FIG. 1.
Figure 4:
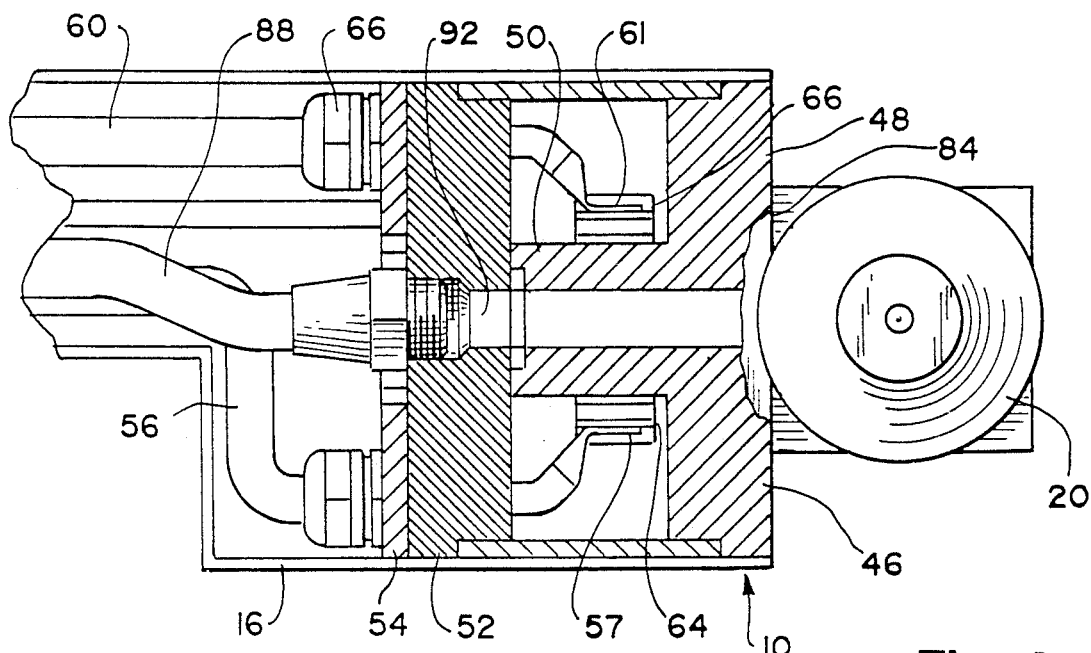
FIG. 4 is a section in plan view of the integrated gapbox of FIG. 3.
Figure 5:
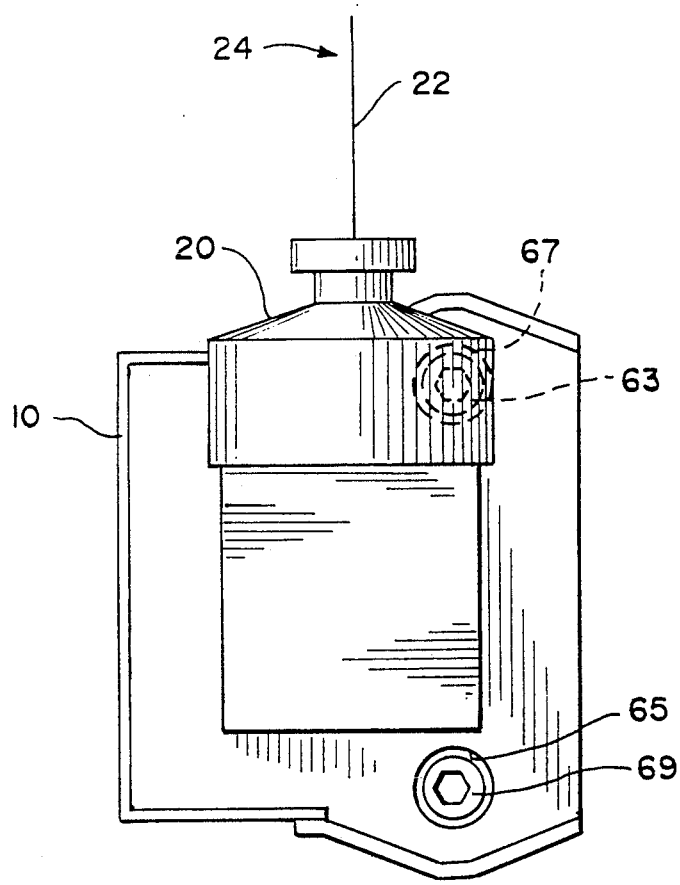
FIG. 5 is an elevational view of the integrated gapbox of FIG. 3 taken along the line 5—5.

Turning now to FIGS. 3-5, therein is shown a preferred embodiment of the integrated gapbox 10 of the present invention. The gapbox 10 provides a housing for the isolation diodes 42a through 42n positioned closely adjacent to the working gap and wire 22 as well as an electrically conducting surface for the output of the isolation diodes 42a through 42n. As best seen in FIG. 4, the gapbox 10 comprises an electrically conductive member 46 having an end portion 48 and an intermediate portion 50. An insulative plate 52 fabricated of nonconductive material such as G-10 phenolic is mounted adjacent the intermediate portion 50 and is in communication with an endplate 54 of the lower arm 16.

Coaxial cables, representatively shown as cables 56, 58 and 60, transmit the signal pulses from the outputs of the switching circuits to the gapbox 10 and are placed within the lower arm 16. It will be appreciated that four cables are supplied to the gapbox 10. The cables 56, 58 and 60 include terminus assemblies 62, 64 and 66 to terminate the outer jackets of the cables into the endplate 54 of the gapbox 10 as will be well known to those skilled in the art.

A pair of screws 63 and 65 are received within openings formed in the conductive member 46, insulative plate 52, and endplate 54 to secure the gapbox 10 to the lower arm 16. Inasmuch as the conductive member 46 is electrically active, insulative bushings 67 and 69 preferably fabricated of G-10 phenolic are fitted over the screws 63 and 65. The lower wire guide assembly 20 is similarly secured to the gapbox conductive member 48 with the use of positioning screws (not shown).

Electrically conductive elements, 57, 59, and 61 corresponding to the coaxial cables 56, 58 and 60 are in electrical contact with a pair of diode subassemblies 64 and 66. The diode subassembly 64 comprises two electrically conductive end portions 68 and 70 which comprise slots 72 and 74 to receive clamping screws (now shown) to mate with respective cable terminating conductive elements 57 and 59. Intermediate portions 76 and 78 of the diode subassembly 64 house the isolation diodes 42a, 42b, 42c and 42d, respectively, with the anode of the diodes in contact with the conductive elements 57 and 59 of the signal-carrying cables 62 and 64. The cathodes of the isolation diodes 42a–42d are contacted with an electrically conductive center block 80, which is preferably fabricated of copper. The center block 80 is formed with an aperture 82 for receiving a screw to electrically connect the center block 80 with the intermediate portion 50 of the gapbox conductive member 46. The diode subassembly 66 is constructed and operates in exactly the same manner.

The end portion 48 of gapbox conductive member 46 is engaged in electrical contact with the lower wire guide assembly 20 to form a contacting surface area 84. The gapbox conductive member 46 as well as the lower wire guide assembly 20 are preferably fabricated of stainless steel. Although stainless steel is not characterized by a particularly high conductivity, the large surface area and minimum transmission distance ensures an electrical path with minimized resistance. The current carrying path of the wire guide assembly 20 houses and is in electrical contact with a carbide contact 86 which electrically engages the wire electrode 22. It will be appreciated that such an arrangement minimizes any transmission line losses and losses due to reflection of the pulse signals in the switching circuitry inasmuch as the pulse signals appearing at the output of the isolation diodes are carried over a minimized conductive path.

In operation, electrical machining pulses are provided in a predetermined waveform to the conductive end portions 68 and 70 of the diode subassemblies 64 and 66 from the switching circuits 40a through 40n via the coaxial cables 56, 58 and 60. Since the machining pulses have negative polarity in the preferred embodiment, the isolation diodes 42a through 42n electrically conduct the machining pulse signals. These signals appear at the electrically conductive center block 80 and traverse the path provided by the electrically conductive member 46 of the gapbox 10 and the lower wire guide assembly 20. The insulative plate 52 prevents conduction of the high voltage electrical pulses through the lower arm 16. In this way, the machining pulses are provided to the carbide contact 84 and the wire electrode 22 over a conductive path having a large area and minimized length. Of course, this will diminish the resistive loss in the machining pulse signal.

Advantageously minimizing the lead length in this manner eliminates the transmission line effect cause by collapsing magnetic fields in the leads. Thus, when the erosion pulses turn on and off, the normally present transient voltage spikes which tend to cause energy dissipated across the isolation diode junctions are either eliminated or substantially reduced. Accordingly, a greater amount of energy is provided to the working gap and wire electrode 22. In addition, since less time is needed to wait until such spikes are absent, the operating frequency of pulses supplied to the wire electrode 22 may be greatly increased to increase the cutting speed of the machining apparatus 8. For example, the machining pulse width in one application may be reduced from four microseconds, which is the pulse width corresponding to a normal operating frequency, to three microseconds. More importantly, the amplitude of the machining pulses provided to the wire electrode may be increased.

FIGS. 3 and 4 also show a flush conduit 88 which provides a passageway for the dielectric liquid to the wire guide and flushing assembly 20, which discharges the fluid to the working gap 24 (shown in FIG. 1). The flush conduit 88 likewise includes a terminus assembly 90 which provides a seal for the conduit 88 to the endplate 54 of the lower arm 16. A bore 92 is formed in the insulation plate 52 and gapbox intermediate section 50 and end section 48 and passes through to the wire guide assembly 20 for flushing the working gap and workpiece. Advantageously, this arrangement provides a cooling mechanism for the isolation diodes 42a through 42d or other electrical componentry in the gapbox 10. In the preferred embodiment, the bore 92 is threaded for a greater heat exchange surface area.

This arrangement minimizes the performance degradation of the electrical componentry by effectively removing heat generated during operation. It has been found that by so cooling the isolation diodes 42a through 42d, the diode junction temperature is cooled to maintain the junction voltage of the diodes at an acceptable operating junction voltage. Accordingly, a higher current tolerance is achieved to operate the system more reliably and efficiently.

From the description thus far provided, an integrated gapbox meeting the aforestated objectives by providing isolation diodes in close relation to the wire and working gap and which uses the dielectric as a cooling mechanism has been described. It will be apparent that the proposed invention may be used in a number of applications and that a number of modifications can be made in the invention disclosed, particularly by those having the benefit of the foregoing teachings, without departing from the spirit of the principles.

For example, it will be understood that the switching circuits 42a through 42n themselves may be placed within the gapbox 10 with appropriate modification to the system to provide control lines to the switching circuits. By so doing, a cooling mechanism is provided for the switching circuits. Advantageously, an elimination of AC waveforms over any significant distance is provided in this arrangement since the switching circuits in the gapbox 10 are supplied with DC voltages.

In addition, fiber optic control may be provided to the gapbox 10 for control of the switching circuitry in the above-mentioned alternative embodiment. Such control eliminates any other capacitive, inductive, or electromagnetic effects of the cabling to the wire electrode 22. It will further be appreciated by those skilled in the art that another contemplated location of the gapbox 10 is adjacent the upper wire assembly 18. It will thus be understood that the features preferably utilized together in the advantageous assembly described herein is just one example of the invention. Accordingly, while the invention disclosed herein has been described with reference to the presently contemplated best mode for practicing the invention, it is intended that this invention be limited only by the scope of the appended claims.

What is claimed is:

1. Apparatus used for the electroerosive working of a conductive workpiece by a machine tool electrode in an electroerosive machining plant having electrode guide and power delivering circuit means including at least one power switching means coupled with the tool electrode via at least one current gating means for protecting the switching circuit means, comprising:

an electrical housing for said at least one current gating means positioned in close relation to the tool electrode, said housing having an electrically conducting portion in contact with said at least one current gating means for providing a power delivering path to the tool electrode, and said housing having fluid cooling means for cooling said gating means.

2. The apparatus of claim 1, wherein said fluid cooling means comprises:

a bore formed between a fluid delivery means and said housing for transferring heat from said housing.

3. The apparatus of claim 2 wherein said bore is threaded for increased heat exchange surface area.

4. The apparatus of claim 1 wherein said electrode guide is electrically conductive, said electrical conducting portion placed in contacting relation with said electrode guide to provide said power delivering path.

5. The apparatus of claim 1 wherein said at least one current gating means comprises an isolation diode having a first terminal and a second terminal, said power switching means coupled with said first terminal and said tool electrode coupled with said second terminal.

6. The apparatus of claim 5 further comprising a plurality of power switching means and a plurality of isolation diodes, each of said power switching means coupled with said first terminal of a respective one of said isolation diodes and each of said second terminals of said isolation diodes coupled with said tool electrode.

7. An electroerosive machining apparatus used for electroerosive machining of a conductive workpiece by a tool electrode disposed relative the workpiece to define a workgap therebetween comprising:

power delivering circuit means comprising a plurality of power switching circuit means coupled with the tool electrode for providing machining pulses thereto, each switching circuit means having an output connected with the input of one of a plurality of isolation diodes for protecting the switching circuit means;

an electrical housing for receiving said isolation diodes having an electrically conductive portion in contact with the outputs of said isolation diodes; and an electrode guide including fluid delivery means for discharging a fluid medium toward the workgap and an electrically conductive portion in contact with said housing conductive portion for providing a conductive path for said machining pulses.

8. The apparatus of claim 7 wherein said housing includes a bore formed therein for providing said fluid medium to said fluid delivery means and for cooling said isolation diodes.

9. The apparatus of claim 8 wherein said bore is threaded.

10. A gapbox integrated in an electro-erosion machine tool having a translatable filamentary erosion electrode supplied by power delivering circuit means comprising a plurality of power switching circuit means, each switching circuit means having an output connected to the input of a respective one of a plurality of isolation diodes for protecting the switching circuit means, and spaced first and second electrode guide and fluid delivery means, said first electrode guide and fluid delivery means having a first outlet for discharging fluid in a direction generally along said electrode, said gapbox comprising:

an electrically conductive housing member having an intermediate portion in electrical contact with the outputs of said isolation diodes and an end portion having a surface in electrical contact with said first electrode guide for providing a conductive path for said power delivering circuit means, said housing member having a longitudinal bore defined therein for providing fluid to said fluid delivery means and to transfer heat generated from said isolation diodes to said fluid.

* * * * *